United States Patent
Prater et al.

(10) Patent No.: US 10,793,284 B2
(45) Date of Patent: Oct. 6, 2020

(54) MULTIMODE CLUTCH ASSEMBLIES FOR ROTORCRAFT

(71) Applicant: Bell Textron Inc., Fort Worth, TX (US)

(72) Inventors: David Andrew Prater, Hurst, TX (US); Eric Stephen Olson, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 16/567,086

(22) Filed: Sep. 11, 2019

(65) Prior Publication Data

US 2020/0247553 A1 Aug. 6, 2020

Related U.S. Application Data

(63) Continuation-in-part of application No. 16/274,520, filed on Feb. 13, 2019.

(60) Provisional application No. 62/801,621, filed on Feb. 5, 2019.

(51) Int. Cl.
| | |
|---|---|
| *B64D 35/00* | (2006.01) |
| *F16D 25/12* | (2006.01) |
| *F16D 48/02* | (2006.01) |
| *F16D 41/00* | (2006.01) |

(52) U.S. Cl.
CPC ............. *B64D 35/00* (2013.01); *F16D 25/14* (2013.01); *F16D 41/00* (2013.01); *F16D 25/123* (2013.01)

(58) Field of Classification Search
CPC ........ B64D 35/00; B64D 35/08; B64C 27/12; F16D 41/00; F16D 41/07; F16D 1/10; F16D 2001/103; F16D 25/14; F16D 25/123; F16D 2121/04

See application file for complete search history.

(56) References Cited

U.S. PATENT DOCUMENTS

| | | | |
|---|---|---|---|
| 3,362,255 | A | 1/1968 | De et al. |
| 3,455,182 | A | 7/1969 | Kelley |

(Continued)

OTHER PUBLICATIONS

European Search Report; Application No. 20152332; EPO; dated Jul. 7, 2020.

*Primary Examiner* — David R Morris
*Assistant Examiner* — Lori Wu
(74) *Attorney, Agent, or Firm* — Lawrence Youst PLLC

(57) ABSTRACT

A multimode clutch assembly is positioned in a powertrain of a rotorcraft. The multimode clutch assembly includes a freewheeling unit having input and output races. The freewheeling unit has a driving mode in which torque applied to the input race is transferred to the output race and an overrunning mode in which torque applied to the output race is not transferred to the input race. A bypass assembly has an engaged position that couples the input and output races of the freewheeling unit. A hydraulic actuator shifts the bypass assembly between the engaged position and a disengaged position. In the disengaged position, the overrunning mode of the freewheeling unit is enabled such that the multimode clutch assembly is configured for unidirectional torque transfer. In the engaged position, the overrunning mode of the freewheeling unit is disabled such that the multimode clutch assembly is configured for bidirectional torque transfer.

18 Claims, 8 Drawing Sheets

(56) References Cited

U.S. PATENT DOCUMENTS

| | | | |
|---|---|---|---|
| 5,271,295 A * | 12/1993 | Marnot | B64C 27/14 244/58 |
| 6,098,921 A | 8/2000 | Piasecki | |
| 8,950,700 B2 | 2/2015 | Westhuizen | |
| 9,580,184 B2 | 2/2017 | Bornes | |
| 10,040,566 B2 | 8/2018 | Waltner | |
| 2006/0269414 A1 * | 11/2006 | Palcic | B64C 27/22 416/170 R |
| 2017/0327241 A1 * | 11/2017 | Mitrovic | F02C 6/02 |
| 2018/0086444 A1 | 3/2018 | Poster et al. | |
| 2018/0172088 A1 | 6/2018 | Peglowski et al. | |
| 2019/0032760 A1 | 1/2019 | Geiser et al. | |

* cited by examiner

MULTIMODE CLUTCH ASSEMBLIES FOR ROTORCRAFT

CROSS-REFERENCE TO RELATED APPLICATIONS

The present application is a continuation-in-part of co-pending application Ser. No. 16/274,520, filed Feb. 13, 2019, which claims the benefit of provisional application No. 62/801,621, filed Feb. 5, 2019, the entire contents of each are hereby incorporated by reference.

TECHNICAL FIELD OF THE DISCLOSURE

The present disclosure relates, in general, to clutch assemblies operable for use on rotorcraft and, in particular, to multimode clutch assemblies operable to enable the selective use of secondary engine power independent of or together with main engine power to drive the main rotor, the tail rotor and/or the accessories of a rotorcraft.

BACKGROUND

Many rotorcraft are capable of taking off, hovering and landing vertically. One such rotorcraft is a helicopter, which has a main rotor that provides lift and thrust to the aircraft. The main rotor not only enables hovering and vertical takeoff and landing, but also enables forward, backward and lateral flight. These attributes make helicopters highly versatile for use in congested, isolated or remote areas. It has been found that the power demand of a rotorcraft can vary significantly based upon the operation being performed. For example, low power demand exists during preflight operations, when power is only needed to operate accessories such as generators, air pumps, oil pumps, hydraulic systems and the like as well as to start the main engine. Certain rotorcraft utilize a dedicated auxiliary power unit to generate preflight accessory power. During takeoff, hover, heavy lifts and/or high speed operations, rotorcraft experience high power demand. Certain rotorcraft utilize multiple main engines or one main engine and a supplemental power unit to generate the required power for the main rotor during such high power demand flight operations. In conventional rotorcraft, the dedicated auxiliary power unit is not operable to provide supplemental power to the main rotor during high power demand flight operations. Accordingly, a need has arisen for improved rotorcraft systems that enable an auxiliary power unit to not only provide accessory power during preflight operations but also to operate as a supplemental power unit to provide power to the main rotor during high power demand flight operations.

SUMMARY

In a first aspect, the present disclosure is directed to a multimode clutch assembly for a rotorcraft. The multimode clutch assembly includes a freewheeling unit having an input race and an output race. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. A hydraulic actuator has an engagement configuration in which the hydraulic actuator supplies an engagement pressure signal that acts on the bypass assembly to shift the bypass assembly from the disengaged position to the engaged position. The hydraulic actuator also has a disengagement configuration in which the hydraulic actuator supplies a disengagement pressure signal that acts on the bypass assembly to shift the bypass assembly from the engaged position to the disengaged position. In the disengaged position of the bypass assembly, the overrunning mode of the freewheeling unit is enabled such that the multimode clutch assembly is configured for unidirectional torque transfer from the input race to the output race. In the engaged position of the bypass assembly, the overrunning mode of the freewheeling unit is disabled such that the multimode clutch assembly is configured for bidirectional torque transfer between the input and output races.

In some embodiments, the hydraulic actuator may be a hydraulic control valve such as a four port, three position hydraulic control valve. In such embodiments, in the engaged position of bypass assembly, the hydraulic control valve maintains the engagement pressure signal on the bypass assembly in an unenergized state of the hydraulic control valve, in a loss of supply pressure state of the hydraulic control valve and/or in a default configuration of the hydraulic control valve. In certain embodiments, the hydraulic control valve is operated from the default configuration to the engagement configuration or the disengagement configuration responsive to an electric signal. In some embodiments, the hydraulic control valve is operated from the engagement configuration or the disengagement configuration to the default configuration responsive to a mechanical signal such as a spring force. In certain embodiments, a lubrication oil circuit may be in fluid communication with the hydraulic actuator to provide pressurized lubrication oil to the hydraulic actuator that serves as the actuation fluid.

In a second aspect, the present disclosure is directed to a powertrain for a rotorcraft. The powertrain includes a main drive system having a main engine coupled to a main rotor gearbox. The powertrain also includes secondary engine. A multimode clutch assembly is positioned between the main drive system and the secondary engine. The multimode clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. A hydraulic actuator has an engagement configuration in which the hydraulic actuator supplies an engagement pressure signal that acts on the bypass assembly to shift the bypass assembly from the disengaged position to the engaged position. The hydraulic actuator also has a disengagement configuration in which the hydraulic actuator supplies a disengagement pressure signal that acts on the bypass assembly to shift the bypass assembly from the engaged position to the disengaged position. In the disengaged position of the bypass assembly, the overrunning mode of the freewheeling unit is enabled such that the multimode clutch assembly is configured for unidirectional torque transfer from the input race to the output race. In the engaged position of the bypass assembly, the overrunning mode of the freewheeling unit is disabled such that the multimode clutch assembly is configured for bidirectional torque transfer between the input and output races.

In certain embodiments, the main engine may be a gas turbine engine and the secondary engine may be a gas turbine engine. In other embodiments, the main engine may be a gas turbine engine and the secondary engine may be an electric motor. In some embodiments, the hydraulic actuator may be a hydraulic control valve such as a four port, three position hydraulic control valve. In such embodiments, in the engaged position of bypass assembly, the hydraulic control valve maintains the engagement pressure signal on the bypass assembly in an unenergized state of the hydraulic control valve, in a loss of supply pressure state of the hydraulic control valve and/or in a default configuration of the hydraulic control valve.

In a third aspect, the present disclosure is directed to a rotorcraft. The rotorcraft includes a main drive system having a main engine coupled to a main rotor gearbox. A main rotor is coupled to the main rotor gearbox and is rotatable thereby. The rotorcraft also includes a secondary engine. A multimode clutch assembly is positioned between the main drive system and the secondary engine. The multimode clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. A hydraulic actuator has an engagement configuration in which the hydraulic actuator supplies an engagement pressure signal that acts on the bypass assembly to shift the bypass assembly from the disengaged position to the engaged position. The hydraulic actuator also has a disengagement configuration in which the hydraulic actuator supplies a disengagement pressure signal that acts on the bypass assembly to shift the bypass assembly from the engaged position to the disengaged position. In the disengaged position of the bypass assembly, the overrunning mode of the freewheeling unit is enabled such that the multimode clutch assembly is configured for unidirectional torque transfer from the input race to the output race. In the engaged position of the bypass assembly, the overrunning mode of the freewheeling unit is disabled such that the multimode clutch assembly is configured for bidirectional torque transfer between the input and output races.

In certain embodiments, the rotorcraft has a preflight configuration in which the bypass assembly is in the disengaged position, the main engine is not operating and the secondary engine provides power to at least one rotorcraft accessory. In some embodiments, the rotorcraft has an enhanced power configuration in which the bypass assembly is in the engaged position, the main engine provides power to the main rotor gearbox and the secondary engine provides power to at least one rotorcraft accessory and to the main drive system through the multimode clutch assembly. In certain embodiments, the rotorcraft has a high efficiency configuration in which the bypass assembly is in the engaged position, the secondary engine is in standby mode and the main engine provides power to the main rotor gearbox and to at least one rotorcraft accessory through the multimode clutch assembly. In some embodiments, the rotorcraft has an enhanced autorotation configuration in which the bypass assembly is in the engaged position, the main engine is not operating and the secondary engine provides power to the main drive system through the multimode clutch assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
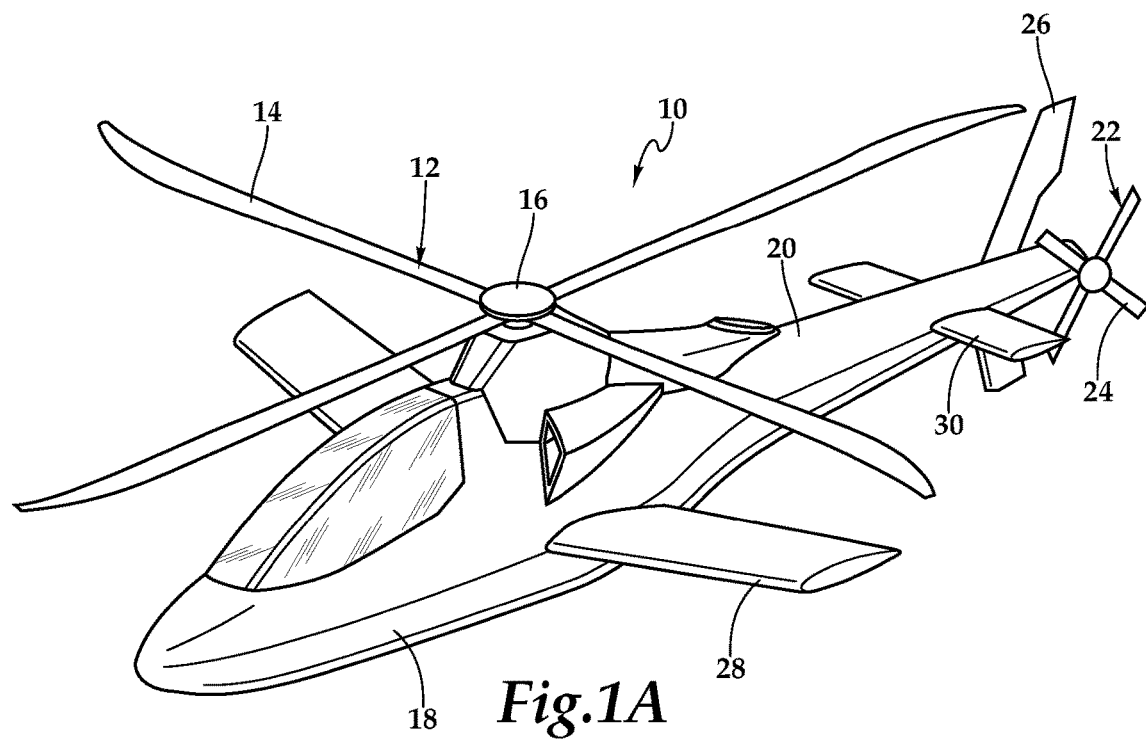
FIGS. 1A-1C are schematic illustrations of a rotorcraft having a multimode clutch assembly in accordance with embodiments of the present disclosure.
Figure 1B:
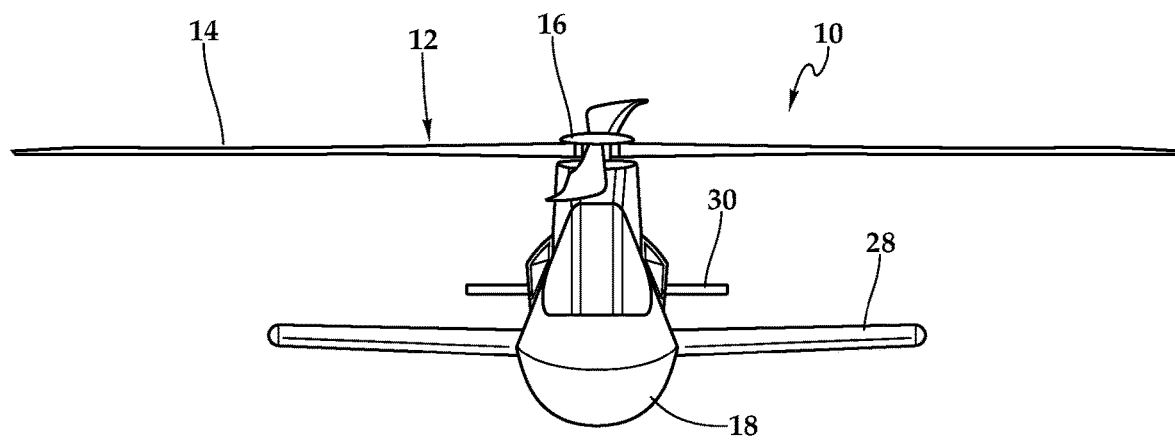
Figure 1C:
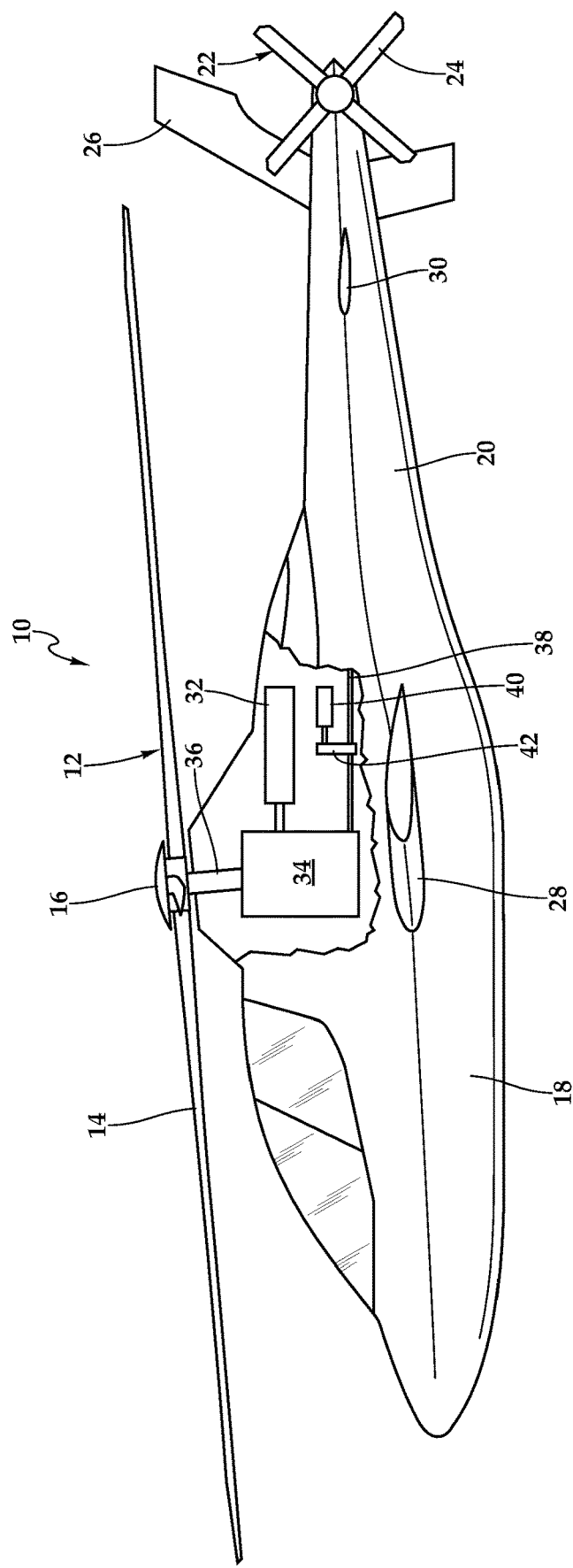

Referring to FIGS. 1A-1C in the drawings, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provide stabilization to helicopter 10 during high speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a secondary engine 40 is coupled to tail rotor drive shaft 38 by a secondary gearbox 42. Together, main engine 40, main rotor gearbox 34, tail rotor drive shaft 38, secondary engine 40 and secondary gearbox 42 as well as the various other shafts and gearboxes coupled therein may be considered as the powertrain of helicopter 10.

Secondary engine 40 is operable as an auxiliary power unit to provide preflight power to the accessories of helicopter 10 such as electric generators, air pumps, oil pumps, hydraulic systems and the like as well as to provide the power required to start main engine 32. In addition, secondary engine 40 is operable to provide supplemental power to main rotor assembly 12 that is additive with the power provided by main engine 32 during, for example, high power demand conditions including takeoff, hover, heavy lifts and high speed flight operations. Secondary engine 40 is also operable to provide emergency power to main rotor assembly 12. For example, in the event of a failure of main engine 32, secondary engine 40 is operable to provide emergency power to enhance the autorotation and flare recovery maneuver of helicopter 10. Use of secondary engine 40 not only enhances the safety of helicopter 10 but also increases the efficiency of helicopter 10. For example, having the extra power provided by secondary engine 40 during high power demand operations allows main engine 32 to be downsized for more efficient single engine operations such as during cruise operations.

It should be appreciated that helicopter 10 is merely illustrative of a variety of aircraft that can implement the embodiments disclosed herein. Indeed, the multimode powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the multimode powertrain of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2A:
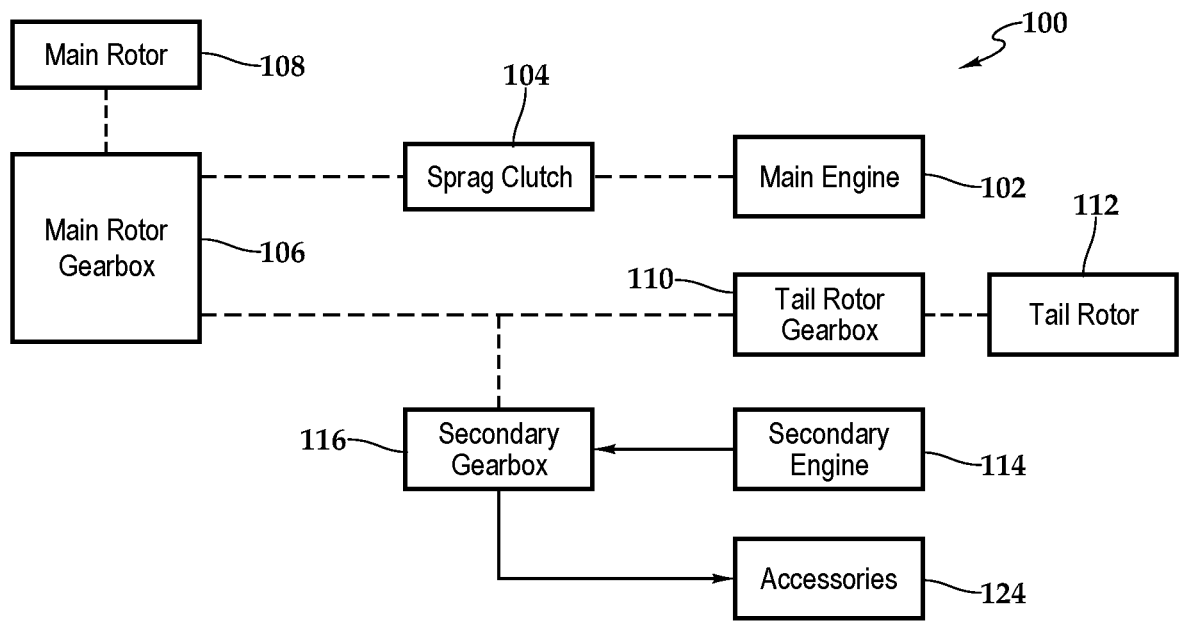
FIGS. 2A-2E are block diagrams of a powertrain including a multimode clutch assembly for a rotorcraft in various operating configurations in accordance with embodiments of the present disclosure.

Referring to FIG. 2A in the drawings, a powertrain 100 of a rotorcraft is illustrated in a block diagram format. Powertrain 100 includes a main engine 102 such as a turbo shaft engine capable of producing 2000 to 4000 horsepower or more, depending upon the particular implementation. Main engine 102 is coupled to a freewheeling unit depicted as sprag clutch 104 that acts as a one-way clutch enabling a driving mode in which torque from main engine 102 is coupled to main rotor gearbox 106 when the rotating speed of the input race, on the main engine side of sprag clutch 104, is matched with the rotating speed of the output race, on the main rotor gearbox side of sprag clutch 104. Importantly, sprag clutch 104 has an overrunning mode in which main engine 102 is decoupled from main rotor gearbox 106 when the rotating speed of the input race is less than the rotating speed of the output race of sprag clutch 104. Operating sprag clutch 104 in the overrunning mode allows, for example, main rotor 108 of helicopter 10 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output speed to a suitable rotor speed so that main engine 102 and main rotor 108 may each rotate at optimum speed during flight operations of helicopter 10. Main rotor gearbox 106 is coupled to a tail rotor gearbox 110 via a suitable tail rotor drive shaft. Tail rotor gearbox 110 includes a gearbox housing and a plurality of gears that may adjust the main rotor gearbox output speed to a suitable rotational speed for operation of tail rotor 112. Main engine 102, sprag clutch 104, main rotor gearbox 106 and tail rotor gearbox 110 as well as the various shafts and gearing systems coupled therewith may be considered the main drive system of powertrain 100.

Powertrain 100 includes a secondary engine 114 such as a turbo shaft engine or an electric motor capable of producing 200 to 400 horsepower or more, depending upon the particular implementation. In the illustrated embodiment, secondary engine 114 may generate between about 5 percent and about 40 percent of the horsepower of main engine 102. In other embodiments, secondary engine 114 may generate between about 10 percent and about 20 percent of the horsepower of main engine 102. Secondary engine 114 is coupled to a secondary gearbox 116. Secondary engine 114 and secondary gearbox 116 as well as the various shafts and gearing systems coupled therewith may be considered the secondary drive system of powertrain 100.

Figure 3A:
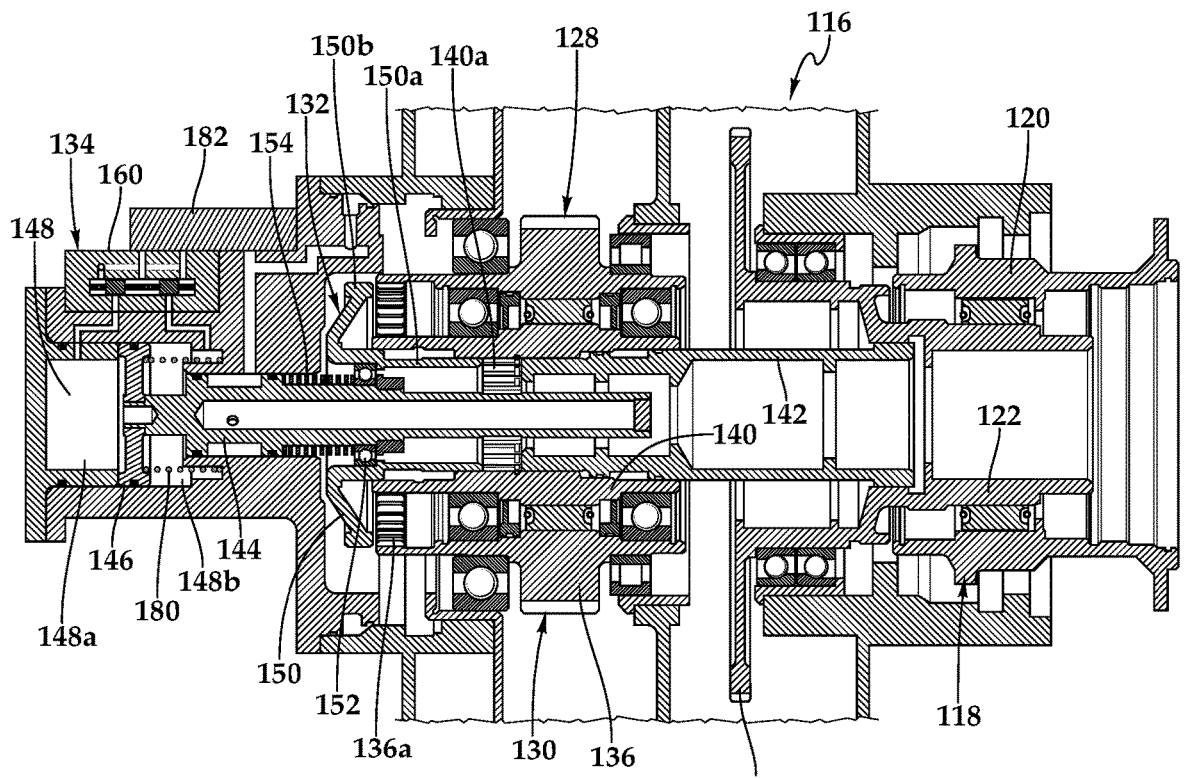
FIGS. 3A-3E are cross sectional views of a multimode clutch assembly for a rotorcraft in various operating configurations in accordance with embodiments of the present disclosure.

Referring additionally to FIG. 3A, secondary gearbox 116 includes a freewheeling unit depicted as sprag clutch 118 that acts as a one-way clutch enabling a driving mode in which torque from secondary engine 114 is coupled through sprag clutch 118 from an input race 120 to an output race 122. In the illustrated embodiment, output race 122 is coupled to an output gear 126 that provides power to accessories 124 such as one or more generators, air pumps, oil pumps, hydraulic systems and the like. Sprag clutch 118 has an overrunning mode in which secondary engine 114 is decoupled from torque transfer through sprag clutch 118 when the rotating speed of input race 120 is less than the rotating speed of output race 122. Operating sprag clutch 118 in the overrunning mode allows, for example, main engine 102 to drive accessories 124 when secondary engine 114 is in standby mode or not operating, as discussed herein.

Secondary gearbox 116 includes a multimode clutch assembly 128 that has a unidirectional torque transfer mode and a bidirectional torque transfer mode. In the illustrated embodiment, multimode clutch assembly 128 includes a freewheeling unit depicted as sprag clutch 130, a bypass assembly 132 and a hydraulic actuator 134. Sprag clutch 130 has an input race 136 that is coupled to main rotor gearbox 106 via the tail rotor drive shaft and one or more gears (not pictured). Sprag clutch 130 has an output race 140 that is coupled to output race 122 of sprag clutch 118 via shaft 142. Sprag clutch 130 may acts as a one-way clutch enabling a driving mode in which torque from the main drive system is coupled through sprag clutch 130 from input race 136 to output race 140. Sprag clutch 130 also has an overrunning mode in which the main drive system is decoupled from torque transfer with sprag clutch 130 when the rotating speed of input race 136 is less than the rotating speed of output race 140 of sprag clutch 130. When sprag clutch 130 is acting as a one-way clutch, multimode clutch assembly 128 is in its unidirectional torque transfer mode. In the unidirectional torque transfer mode of multimode clutch assembly 128, torque can be driven from the main drive system through secondary gearbox 116 but torque cannot be driven from secondary gearbox 116 to the main drive system of powertrain 100.

Figure 3B:
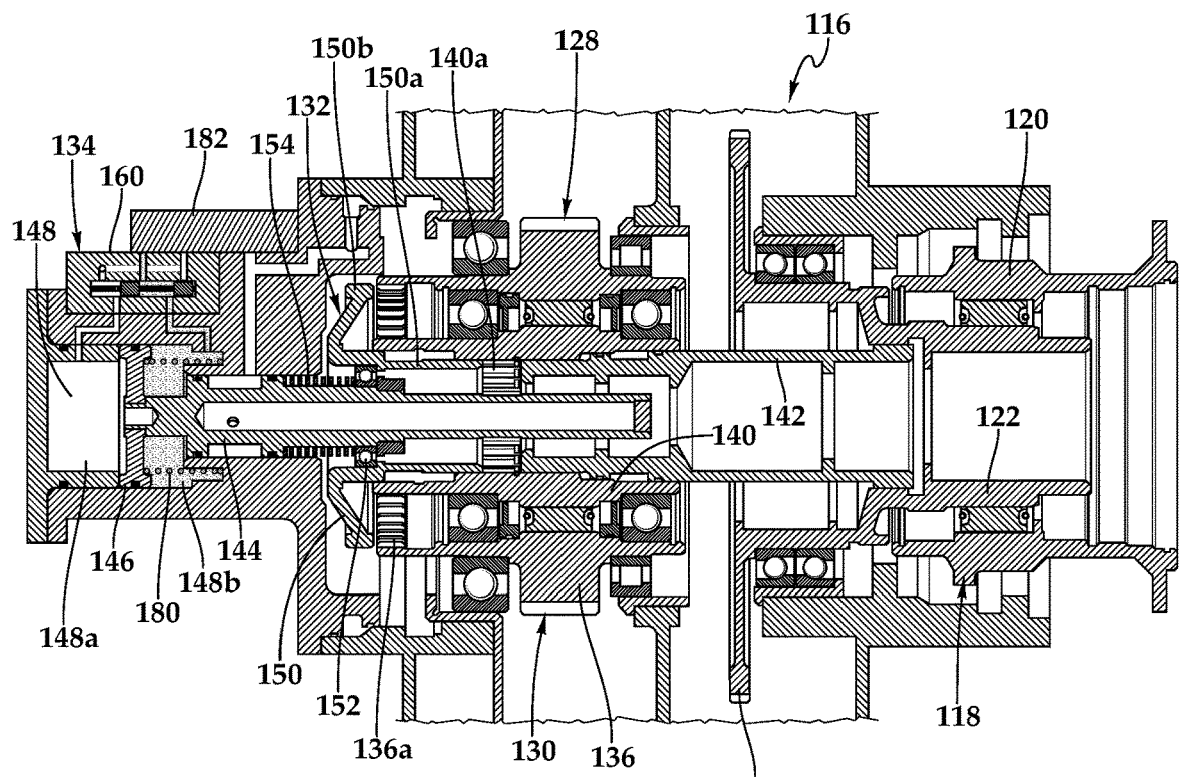
Figure 3C:
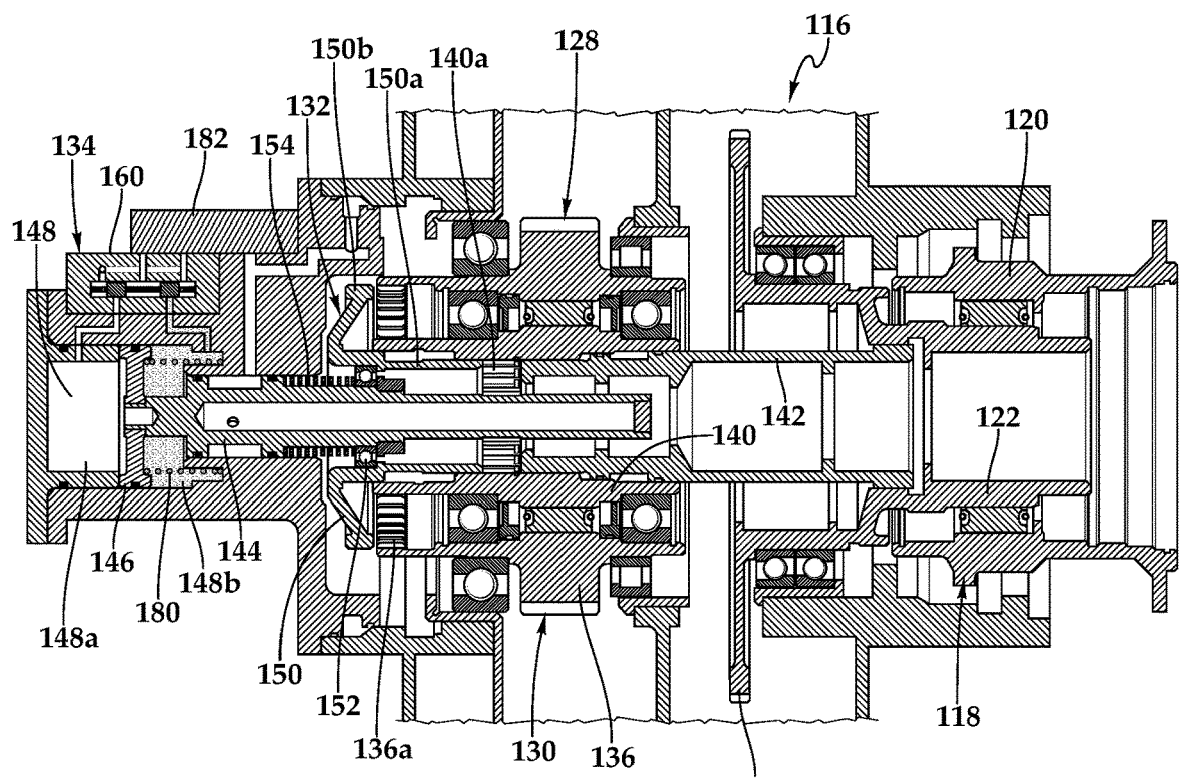
Figure 3D:
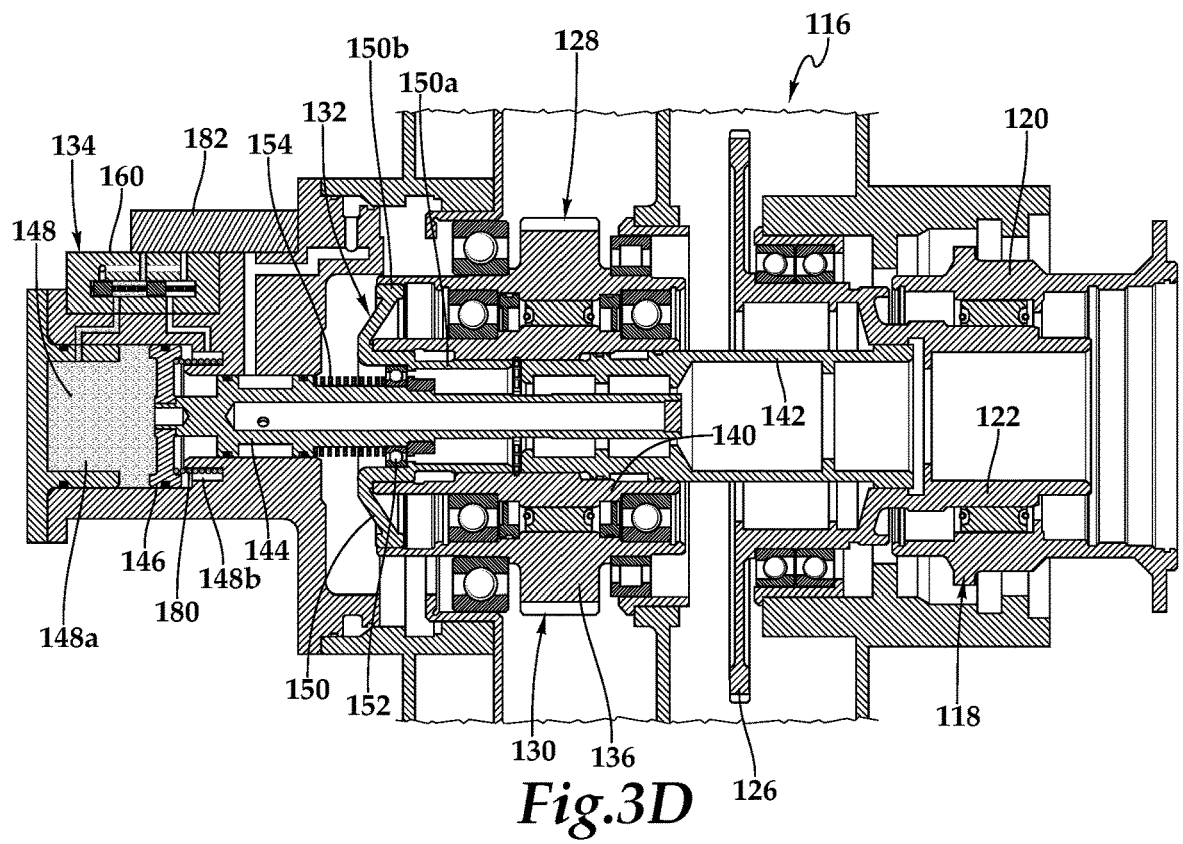

Referring additionally to FIG. 3D, the overrunning mode of multimode clutch assembly 128 can be disabled by engaging bypass assembly 132 to couple input race 136 and output race 140 of sprag clutch 130 to functionally form a connected shaft. In this configuration with bypass assembly 132 preventing sprag clutch 130 from operating in the overrunning mode, multimode clutch assembly 128 is in its bidirectional torque transfer mode. In the bidirectional torque transfer mode of multimode clutch assembly 128, torque can be driven from the main drive system through secondary gearbox 116 and torque can be driven from secondary gearbox 116 to the main drive system of powertrain 100.

Multimode clutch assembly 128 is operated between the unidirectional and bidirectional torque transfer modes by actuating bypass assembly 132 between its disengaged position (FIG. 3A) and its engaged position (FIG. 3D). The operations of engaging and disengaging bypass assembly 132 may be pilot controlled and/or may be automated by the flight control computer of helicopter 10 and may be determined according to the operating conditions of helicopter 10. In the illustrated embodiment, bypass assembly 132 is actuated responsive to pressure signals supplied by hydraulic actuator 134. In other embodiments, bypass assembly 132 could be actuated using an electrical actuator, a mechanical actuator or other suitable actuation device.

In the illustrated embodiment, bypass assembly 132 includes a piston 144 that is movable between first and second positions responsive to hydraulic pressure acting on a piston end 146 that is slidably disposed and sealed between hydraulic chamber 148a and hydraulic chamber 148b of a hydraulic cylinder 148. Piston 144 is coupled to a bypass coupling 150 at a bearing assembly 152 that provides for relative rotation therebetween. A biasing element depicted as wave spring 154 is positioned between a shoulder of piston 144 and bearing assembly 152. Bypass coupling 150 includes a shaft 150a having outer splines (not visible) and a ring gear 150b having outer splines (not visible). The outer splines of shaft 150a are in mesh with inner splines 140a of output race 140 of sprag clutch 130 such that when output race 140 is rotating, bypass coupling 150 also rotates. The outer splines of ring gear 150b are selectively engaged with and disengaged from inner splines 136a of input race 136 to operate multimode clutch assembly 128 between the unidirectional and bidirectional torque transfer modes.

Figure 4A:
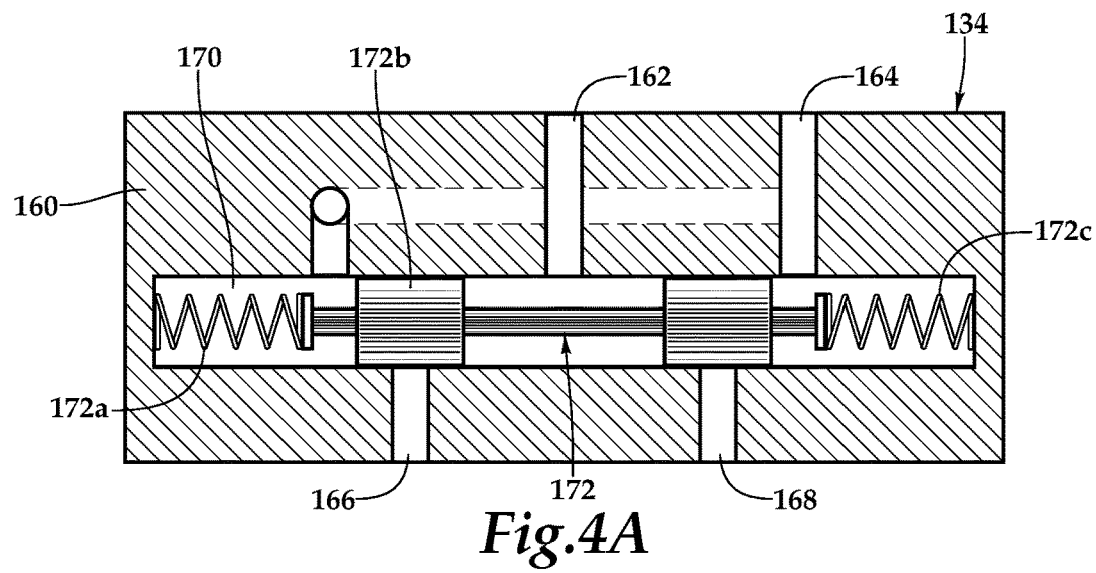
FIGS. 4A-4C are schematic illustrations of a hydraulic control valve for a multimode clutch assembly of a rotorcraft in various operating configurations in accordance with embodiments of the present disclosure.
Figure 4B:
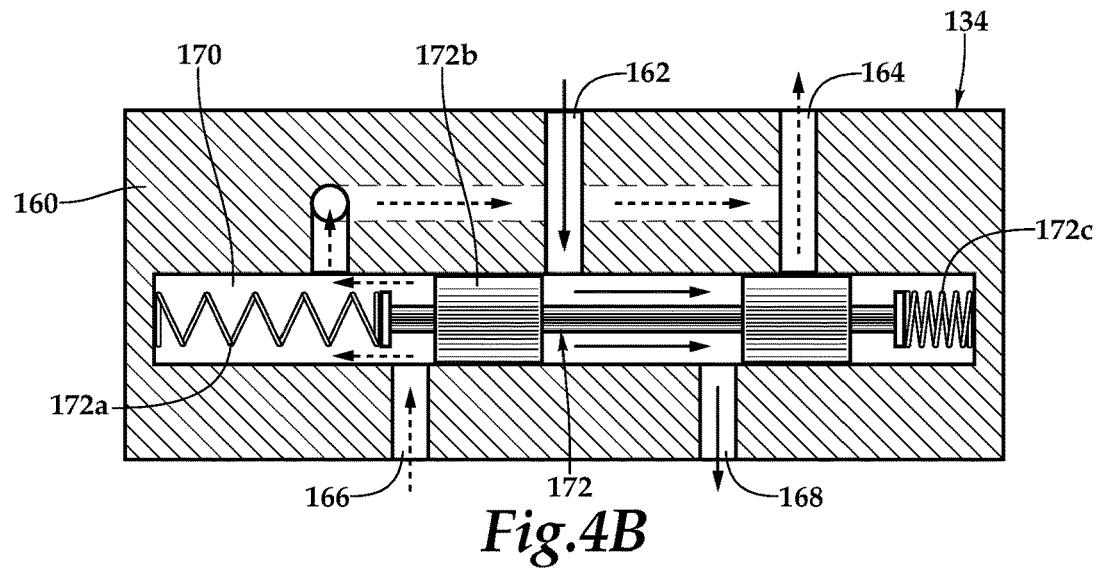
Figure 4C:
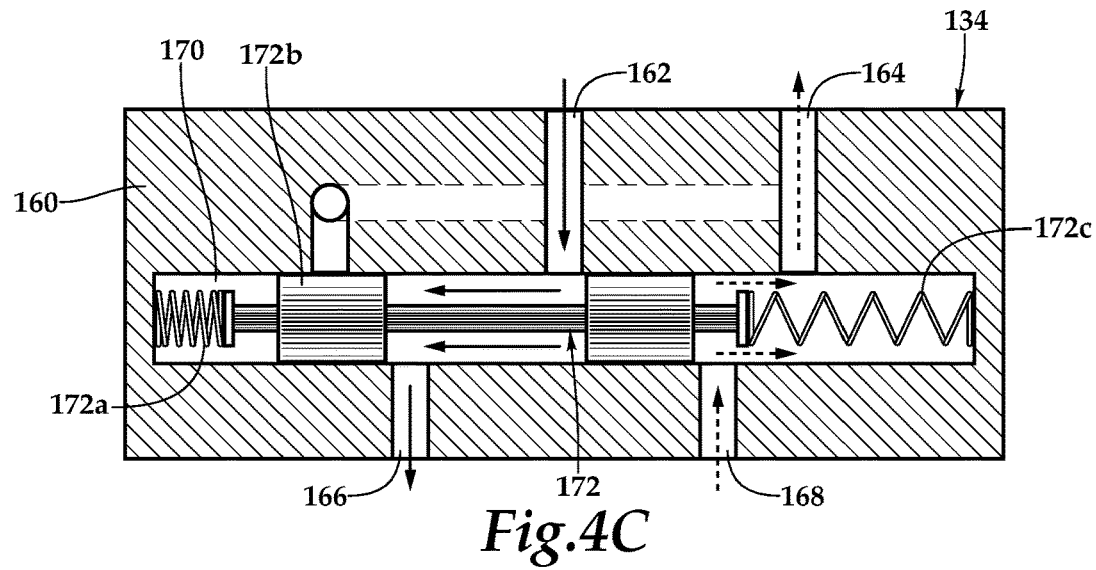

The position of piston 144 is hydraulically controlled responsive to pressure signals supplied from hydraulic actuator 134. Referring additionally to FIGS. 4A-4C, hydraulic actuator 134 includes a hydraulic control valve 160 that selectively routes pressure signals to hydraulic cylinder 148. In the illustrated embodiment, hydraulic control valve 160 has a supply port 162 that receives actuating fluid from a fluid pressure source such as lubricating oil from a lubrication circuit 182 of secondary gearbox 116. In other embodiments, the actuating fluid may be hydraulic fluid from a hydraulic fluid pump or a hydraulic fluid accumulator of a hydraulic fluid system. Hydraulic control valve 160 has a drain port 164 that returns actuating fluid to lubrication circuit 182. For example, lubrication circuit 182 may include an oil pump that pressurizes and routes lubricating oil to secondary gearbox 116 and to supply port 162. In addition, lubrication circuit 182 may include an oil filter and a return path that receives lubricating oil from secondary gearbox 116 and from drain port 164. As illustrated, hydraulic control valve 160 has an engagement port 166 that is in fluid communication with hydraulic chamber 148a and a disengagement port 168 that is in fluid communication with hydraulic chamber 148b. Disposed within a cylinder 170 of hydraulic control valve 160 is a spring centered spool assembly 172 including spring 172a, spool 172b and spring 172c. Springs 172a, 172c mechanically signal spool 172b to a default configuration of hydraulic control valve 160 with spool 172b preventing fluid flow among supply port 162, drain port 164, engagement port 166 and disengagement port 168 when hydraulic control valve 160 is in an unenergized state.

Hydraulic control valve 160 is preferably operated responsive to electric signals that energize spool 172b causing spool 172b to shift to the right or left in the figures. For example, hydraulic control valve 160 may be operated from the default configuration, as best seen in FIG. 4A, to the disengagement configuration, as best seen in FIG. 4B, by energizing spool 172b to shift to the right. In the disengagement configuration, hydraulic control valve 160 routes supply pressure from supply port 162 to disengagement port 168, as indicated by the solid arrows. In this configuration, hydraulic control valve 160 supplies a disengagement pressure signal through disengagement port 168 to hydraulic chamber 148b. At the same time, engagement port 166 provides fluid communication between hydraulic chamber 148a and drain port 164 which releases pressure from hydraulic chamber 148a, as indicated by the dashed arrows. Once the electric signal energizing spool 172b is deactivated, springs 172a, 172c mechanically signal spool 172b to the default configuration of hydraulic control valve 160, as best seen in FIG. 4A.

As another example, hydraulic control valve 160 may be operated from the default configuration, as best seen in FIG. 4A, to the engagement configuration, as best seen in FIG. 4C, by energizing spool 172b to shift to the left. In the engagement configuration, hydraulic control valve 160 routes supply pressure from supply port 162 to engagement port 166, as indicated by the solid arrows. In this configuration, hydraulic control valve 160 supplies an engagement pressure signal through engagement port 166 to hydraulic chamber 148a. At the same time, disengagement port 168 provides fluid communication between hydraulic chamber 148b and drain port 164 which releases pressure from hydraulic chamber 148b, as indicated by the dashed arrows. Once the electric signal energizing spool 172b is deactivated, springs 172a, 172c mechanically signal spool 172b to the default configuration of hydraulic control valve 160, as best seen in FIG. 4A. Thus, in the illustrated embodiments, hydraulic control valve 160 is a four port, three position, spring centered hydraulic control valve.

Returning to FIGS. 2A-2E, operating scenarios for helicopter 10 will now be described. In FIG. 2A, powertrain 100 is in a preflight configuration in which main engine 102 is not yet operating as indicated by the dashed lines between the components of the main drive system. As the main drive system is not turning, no torque is being applied to secondary gearbox 116 from the main drive system as indicated by the dashed line therebetween. Prior to starting secondary engine 114, a status of multimode clutch assembly 128 should be checked. With no pressure at supply port 162 and using battery power, for example, hydraulic control valve 160 should be cycled from the default configuration to both the disengagement configuration and the engagement configuration then back to the default configuration to remove any pressure from hydraulic cylinder 148. Once hydraulic chambers 148a, 148b are depressurized, a spring 180 is operable to biases bypass assembly 132 to the disengaged position, as best seen in FIG. 3A. Following the status check, multimode clutch assembly 128 is in the unidirectional torque transfer mode as bypass assembly 132 is in the disengaged position. Secondary engine 114 is now started such that secondary engine 114 provides torque and rotational energy within the secondary drive system, as indicated by the arrows between secondary engine 114, secondary gearbox 116 and accessories 124. More specifically, secondary engine 114 is driving input race 120 of sprag clutch 118, which causes output race 122 of sprag clutch 118 to drive output gear 126 which in turn provides power to accessories 124. While operating in the preflight configuration, the pilot of helicopter 10 can proceed through the startup procedure.

Prior to starting main engine 102, the status of multimode clutch assembly 128 should be checked again. With secondary engine 114 and secondary gearbox 116 operating, fluid pressure from lubrication circuit 182 of secondary gearbox 116 is now available to hydraulic actuator 134. In this implementation, supply port 162 is in communication with the high pressure side of lubrication circuit 182 and high pressure lubricating oil serves as the actuating fluid for hydraulic control valve 160. Hydraulic control valve 160 is now cycled from the default configuration (FIG. 4A) to the disengagement configuration (FIG. 4B) to supply a disengagement pressure signal to hydraulic chamber 148b, as best seen in FIG. 3B and as indicated by the stippling in hydraulic chamber 148b. Together with spring 180, the disengagement pressure signal biases bypass assembly 132 to the disengaged position. Once the electric signal energizing spool 172b is deactivated, springs 172a, 172c mechanically signal spool 172b to the default configuration of hydraulic control valve 160 (FIG. 4A) which seals the disengagement pressure signal within hydraulic chamber 148b, as best seen in FIG. 3C, thus preventing bypass assembly 132 from shifting out of the disengaged position. This process step provides further assurance that bypass assembly 132 is secured in the disengaged position prior to starting main engine 102.

Figure 2B:
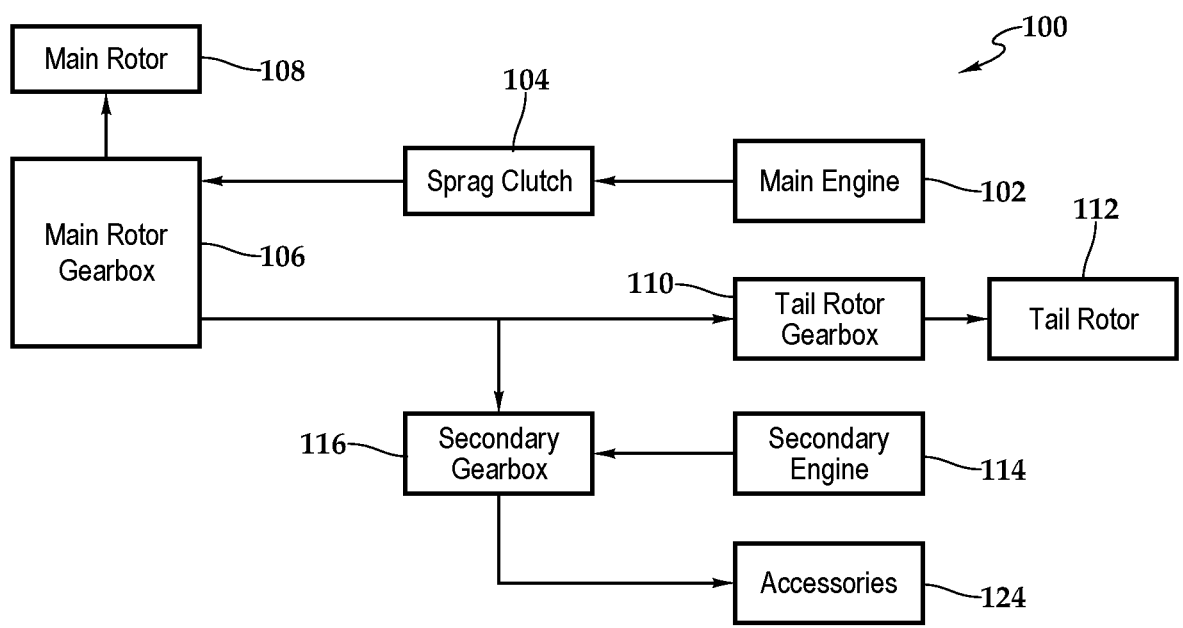
Figure 2C:
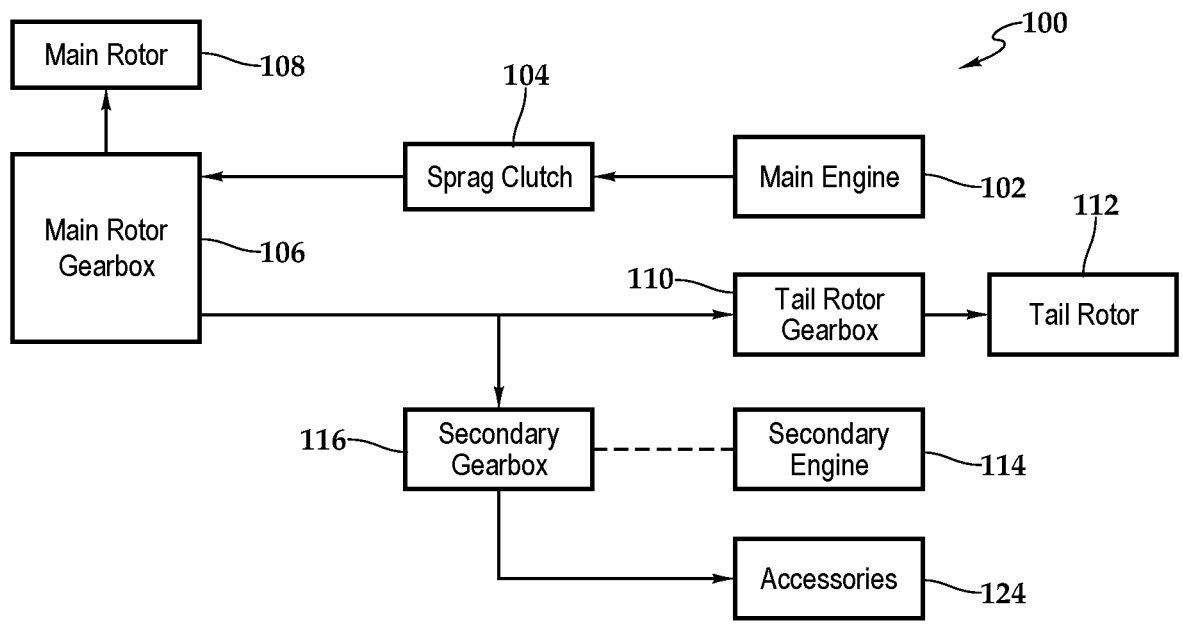
Figure 2D:
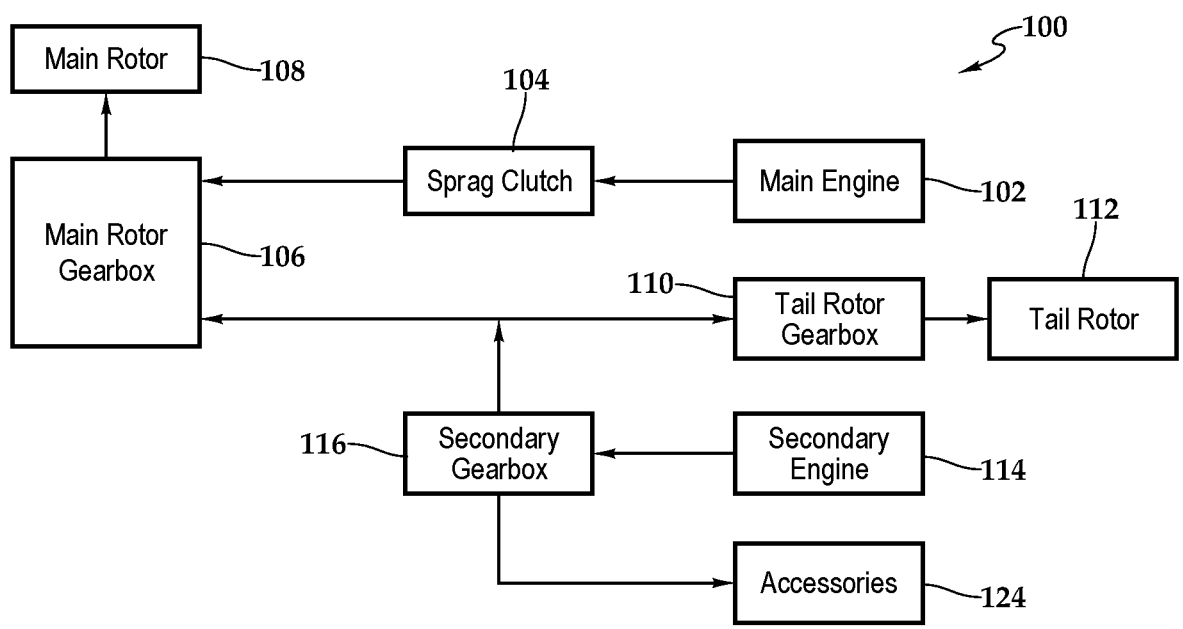

Once main engine 102 is started, torque is delivered through the main drive system as indicated by the arrows between the components within the main drive system, as best seen in FIG. 2B. In addition, the main drive system may supply torque to secondary gearbox 116, as indicated by the arrow therebetween. When power is applied to input race 136 of sprag clutch 130 from the main drive system such that input race 136 and output race 140 of sprag clutch 130 are turning together at the same speed, multimode clutch assembly 128 may be operated from the unidirectional torque transfer mode to the bidirectional torque transfer mode. Specifically, bypass assembly 132 can now be actuated from the disengaged position to the engaged position responsive to pilot input and/or operation of the flight control computer of helicopter 10. Using the high pressure lubricating oil from lubrication circuit 182 as the actuating fluid, hydraulic control valve 160 is now cycled from the default configuration (FIG. 4A) to the engagement configuration (FIG. 4C) to supply an engagement pressure signal to hydraulic chamber 148a, as best seen in FIG. 3D and as indicated by the stippling in hydraulic chamber 148a. At the same time, the disengagement pressure signal is released from hydraulic chamber 148b through disengagement port 168 and drain port 164 to the low pressure side of lubrication circuit 182.

Figure 3E:
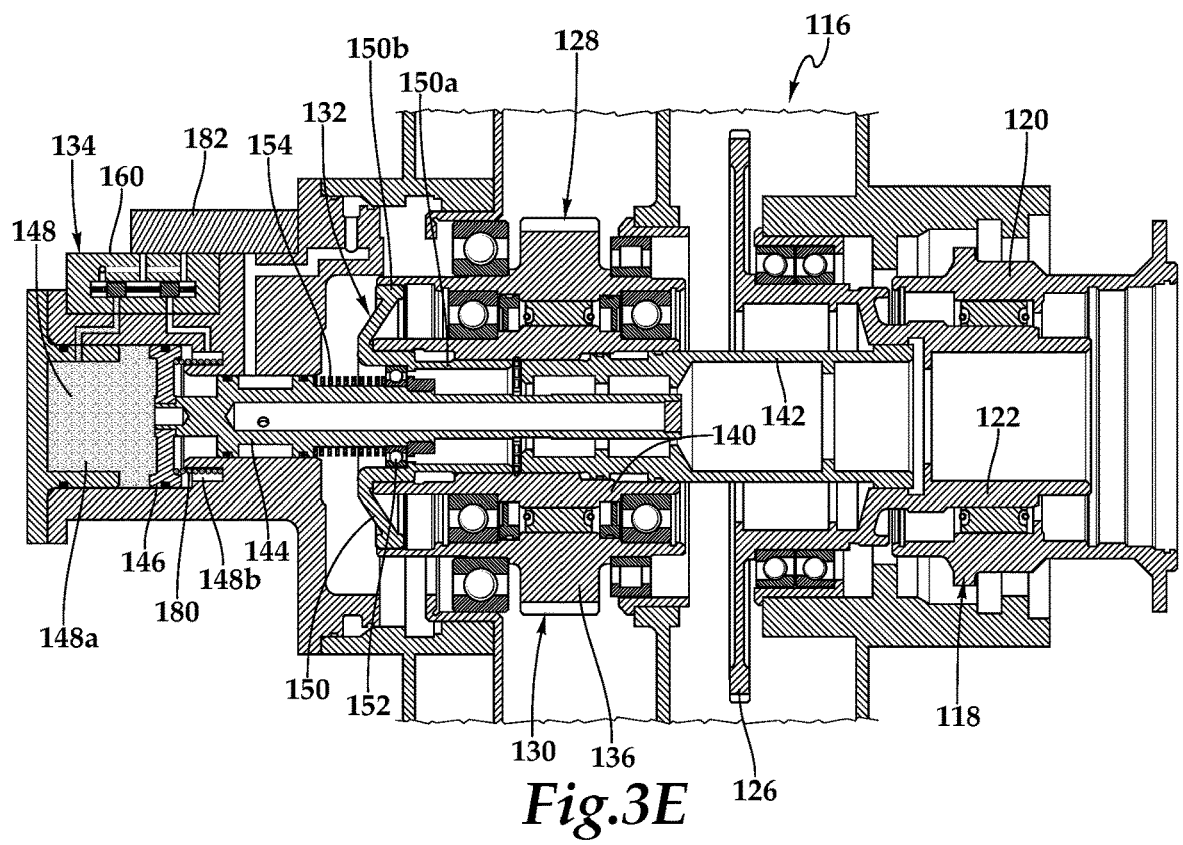

The engagement pressure signal shifts bypass assembly 132 to the engagement position, as best seen in FIG. 3D. More specifically, the hydraulic pressure biases bypass coupling 150 toward input race 136 of sprag clutch 130 causing the outer splines of ring gear 150b to mesh with inner splines 136a of input race 136, thereby shifting bypass assembly 132 to the engaged position and multimode clutch assembly 128 to the bidirectional torque transfer mode. Wave spring 154 assists in overcoming any misalignment in the clocking of the outer splines of ring gear 150b and inner splines 136a of input race 136 by allowing full actuation of piston 144 while maintaining pressure between ring gear 150b and input race 136 so that when bypass assembly 132 and input race 136 start to rotate relative to each other, the outer splines of ring gear 150b will mesh with inner splines 136a of input race 136. In the bidirectional torque transfer mode of multimode clutch assembly 128, when input race 136 of sprag clutch 130 is driven by the main drive system, bypass assembly 132 and output race 140 rotate therewith. In addition, when output race 140 of sprag clutch 130 is driven by secondary engine 114, bypass assembly 132 and input race 136 rotates therewith to supply power to main drive system, thereby bypassing the overrunning mode of sprag clutch 130 such that multimode clutch assembly 128 operates with the functionality of a connected shaft. Once the electric signal energizing spool 172b is deactivated, springs 172a, 172c mechanically signal spool 172b to the default configuration of hydraulic control valve 160 (FIG. 4A) which seals the engagement pressure signal within hydraulic chamber 148a, as best seen in FIG. 3E, thus preventing bypass assembly 132 from shifting out of the engaged position.

In the engaged position, bypass assembly 132 couples input race 136 with output race 140 such that multimode clutch assembly 128 is in the bidirectional torque transfer mode. In this configuration, secondary engine 114 may be operated in standby mode or powered down as indicated by the dashed line between secondary engine 114 and secondary gearbox 116 in FIG. 2C, such that main engine 102 is driving not only the main drive system but also accessories 124, as indicated by the arrows to secondary gearbox 116 and accessories 124. This configuration of powertrain 100 may be referred to as a high efficiency configuration. In addition, secondary engine 114 may be operated to provide supplemental power to the main drive system as indicated by the arrow between secondary gearbox 116 and the tail rotor drive shaft in FIG. 2D. This configuration of powertrain 100 may be referred to as an enhanced power configuration.

Continuing with the operating scenarios of helicopter 10, once multimode clutch assembly 128 is in the bidirectional torque transfer mode, helicopter 10 is ready for takeoff. Assuming a high power demand takeoff and/or hover, powertrain 100 is preferably in the enhanced power configuration of FIG. 2D for takeoff. Once helicopter 10 has completed the takeoff and is flying at a standard speed cruise, it may be desirable to place secondary engine 114 in standby mode such as idle operations or even shut secondary engine 114 down to operate helicopter 10 in the high efficiency configuration depicted in FIG. 2C. In this configuration, secondary engine 114 provide no power as indicated by the dashed line between secondary engine 114 and secondary gearbox 116 with torque and rotational energy being provided by main engine 102 through the main drive system to secondary gearbox 116 and accessories 124. More specifically, power from the main drive system is transferred through multimode clutch assembly 128 to output gear 126 by input race 136 and output race 140 that are coupled together by bypass assembly 132 then by shaft 142 and output race 122 of sprag clutch 120. Rotational energy is not sent to input race 122, as sprag clutch 120 is operating in its overrunning mode. Thus, in addition to powering main rotor 108 and tail rotor 112, in the high efficiency configuration of powertrain 100, main engine 102 also powers accessories 124.

It should be noted that multimode clutch assembly 128 is preferably maintained in its bidirectional torque transfer mode during all flight operations. In the illustrated embodiment, this is achieved by maintaining the engagement pressure signal on bypass assembly 132 with hydraulic control valve 160. As discussed herein, in an unenergized state, spool 172b is spring force biased to place hydraulic control valve 160 in the default configuration which seals the engagement pressure signal in hydraulic chamber 148a. Importantly, in a loss of supply pressure state of hydraulic control valve 160, such as a loss of lubrication oil pressure, hydraulic control valve 160 nonetheless maintains the engagement pressure signal in hydraulic chamber 148a as the default configuration of hydraulic control valve 160 isolates the engagement pressure signal from the supply pressure. Similarly, in a loss of electrical power state of hydraulic control valve 160, the engagement pressure signal in hydraulic chamber 148a is maintained as hydraulic control valve 160 remains in the default configuration. Thus, multimode clutch assembly 128 provides fail-safe operations.

Figure 2E:
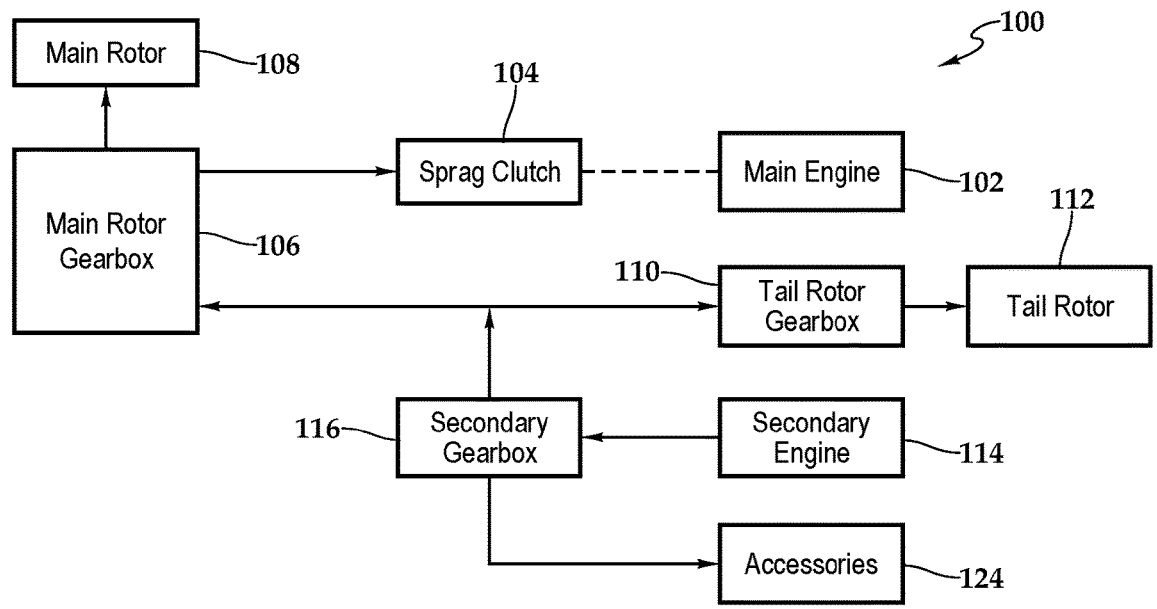

In addition, it is preferred that multimode clutch assembly 128 be maintained in its bidirectional torque transfer mode as a safety feature in the event of a failure in main engine 102 during flight, as indicated by the dashed lines between main engine 102 and sprag clutch 104 in FIG. 2E. In this case, an autorotation maneuver may be performed in which the descent rate of helicopter 10 is reduced using the aerodynamic force of the air moving up through main rotor 108. Upon final approach during the autorotation landing, helicopter 10 performs a flare recovery maneuver in which the kinetic energy of main rotor 108 is converted into lift using aft cyclic control. Both the autorotation maneuver and the flare recovery maneuver are enhanced by operating secondary engine 114 and sending power through secondary gearbox 116 to the main drive system, as indicated by the arrow therebetween, and more particularly by sending power to main rotor 108 as indicated by the arrows leading thereto. It is noted that rotational energy is also sent to sprag clutch 104, which is operating in its overrunning mode while main engine 102 is not operating. This configuration may be referred to as the enhanced autorotation configuration of powertrain 100 in which main engine 102 is not operating but secondary engine 114 is providing power to main rotor 108 through multimode clutch assembly 128, which is in the bidirectional torque transfer mode.

When it is desired to operate multimode clutch assembly 128 from the bidirectional to the unidirectional torque transfer mode, input race 136 preferably drives output race 140 of sprag clutch 130. Hydraulic pressure may then be used to shift bypass coupling 150 away from input race 136 of sprag clutch 130. More specifically, hydraulic control valve 160 is cycled from the default configuration (FIG. 4A) to the disengagement configuration (FIG. 4B) to supply a disengagement pressure signal to hydraulic chamber 148b, as best seen in FIG. 3B and as indicated by the stippling in hydraulic chamber 148b. At the same time, the engagement pressure signal is released from hydraulic chamber 148a through engagement port 166 and drain port 164. Together with spring 180, the disengagement pressure signal biases bypass assembly 132 toward the disengaged position such that the outer splines of ring gear 150b shift out of mesh with inner splines 136a of input race 136. Once the electric signal energizing spool 172b is deactivated, springs 172a, 172c mechanically signal spool 172b to the default configuration of hydraulic control valve 160 (FIG. 4A) which seals the disengagement pressure signal within hydraulic chamber 148b, as best seen in FIG. 3C, thus preventing bypass assembly 132 from shifting out of the disengaged position.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A multimode clutch assembly for a rotorcraft, the multimode clutch assembly comprising:
  a freewheeling unit having an input race and an output race, the freewheeling unit having a driving mode in which torque applied to the input race is transferred to the output race and an overrunning mode in which torque applied to the output race is not transferred to the input race;
  a bypass assembly having an engaged position in which the bypass assembly couples the input and output races of the freewheeling unit and a disengaged position in which the bypass assembly does not couple the input and output races of the freewheeling unit; and
  a four port, three position hydraulic control valve having an engagement configuration supplying an engagement pressure signal to shift the bypass assembly from the disengaged position to the engaged position and a disengagement configuration supplying a disengagement pressure signal to shift the bypass assembly from the engaged position to the disengaged position;

wherein, in the disengaged position of the bypass assembly, the overrunning mode of the freewheeling unit is enabled such that the multimode clutch assembly is configured for unidirectional torque transfer from the input race to the output race; and wherein, in the engaged position of the bypass assembly, the overrunning mode of the freewheeling unit is disabled such that the multimode clutch assembly is configured for bidirectional torque transfer between the input and output races.

2. The multimode clutch assembly as recited in claim 1 wherein, in the engaged position of the bypass assembly, the hydraulic control valve maintains the engagement pressure signal on the bypass assembly in an unenergized state of the hydraulic control valve.

3. The multimode clutch assembly as recited in claim 1 wherein, in the engaged position of the bypass assembly, the hydraulic control valve maintains the engagement pressure signal on the bypass assembly in a loss of supply pressure state of the hydraulic control valve.

4. The multimode clutch assembly as recited in claim 1 wherein, in the engaged position of the bypass assembly, the hydraulic control valve maintains the engagement pressure signal on the bypass assembly in a default configuration of the hydraulic control valve.

5. The multimode clutch assembly as recited in claim 4 wherein the hydraulic control valve is operated from the default configuration to the engagement configuration or the disengagement configuration responsive to an electric signal.

6. The multimode clutch assembly as recited in claim 4 wherein the hydraulic control valve is operated from the engagement configuration or the disengagement configuration to the default configuration responsive to a mechanical signal.

7. The multimode clutch assembly as recited in claim 1 further comprising a lubrication oil circuit in fluid communication with the hydraulic control valve, the lubrication oil circuit providing pressurized lubrication oil to the hydraulic control valve.

8. A powertrain for a rotorcraft, the powertrain comprising:
a main drive system including a main engine coupled to a main rotor gearbox;
a secondary engine; and
a multimode clutch assembly positioned between the main drive system and the secondary engine, the multimode clutch assembly including:
a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
a bypass assembly having an engaged position in which the bypass assembly couples the input and output races of the freewheeling unit and a disengaged position in which the bypass assembly does not couple the input and output races of the freewheeling unit; and
a hydraulic actuator having an engagement configuration supplying an engagement pressure signal to shift the bypass assembly from the disengaged position to the engaged position and a disengagement configuration supplying a disengagement pressure signal to shift the bypass assembly from the engaged position to the disengaged position;

wherein, in the disengaged position of the bypass assembly, the overrunning mode of the freewheeling unit is enabled such that the multimode clutch assembly is configured for unidirectional torque transfer from the input race to the output race; and wherein, in the engaged position of the bypass assembly, the overrunning mode of the freewheeling unit is disabled such that the multimode clutch assembly is configured for bidirectional torque transfer between the input and output races.

9. The powertrain as recited in claim 8 wherein the main engine further comprises a first gas turbine engine and wherein the secondary engine further comprises a second gas turbine engine.

10. The powertrain as recited in claim 8 wherein the main engine further comprises a gas turbine engine and wherein the secondary engine further comprises an electric motor.

11. The powertrain as recited in claim 8 wherein the hydraulic actuator further comprises a hydraulic control valve.

12. The powertrain as recited in claim 11 wherein the hydraulic control valve further comprises a four port, three position hydraulic control valve.

13. The powertrain as recited in claim 11 wherein, in the engaged position of the bypass assembly, the hydraulic control valve maintains the engagement pressure signal on the bypass assembly in an unenergized state of the hydraulic control valve, in a loss of supply pressure state of the hydraulic control valve and in a default configuration of the hydraulic control valve.

14. A rotorcraft comprising:
a main drive system including a main engine coupled to a main rotor gearbox;
a main rotor coupled to the main rotor gearbox and rotatable thereby;
a secondary engine; and
a multimode clutch assembly positioned between the main drive system and the secondary engine, the multimode clutch assembly including:
a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
a bypass assembly having an engaged position in which the bypass assembly couples the input and output races of the freewheeling unit and a disengaged position in which the bypass assembly does not couple the input and output races of the freewheeling unit; and
a hydraulic actuator having an engagement configuration supplying an engagement pressure signal to shift the bypass assembly from the disengaged position to the engaged position and a disengagement configuration supplying a disengagement pressure signal to shift the bypass assembly from the engaged position to the disengaged position;

wherein, in the disengaged position of the bypass assembly, the overrunning mode of the freewheeling unit is enabled such that the multimode clutch assembly is configured for unidirectional torque transfer from the input race to the output race; and wherein, in the engaged position of the bypass assembly, the overrunning mode of the freewheeling unit is disabled such that the multimode clutch assembly is configured for bidirectional torque transfer between the input and output races.

15. The rotorcraft as recited in claim 14 wherein, in a preflight configuration, the bypass assembly is in the disengaged position, the main engine is not operating and the secondary engine provides power to at least one rotorcraft accessory.

16. The rotorcraft as recited in claim 14 wherein, in an enhanced power configuration, the bypass assembly is in the engaged position, the main engine provides power to the main rotor gearbox and the secondary engine provides power to at least one rotorcraft accessory and to the main drive system through the multimode clutch assembly.

17. The rotorcraft as recited in claim 14 wherein, in a high efficiency configuration, the bypass assembly is in the engaged position, the secondary engine is in standby mode, the main engine provides power to the main rotor gearbox and to at least one rotorcraft accessory through the multimode clutch assembly.

18. The rotorcraft as recited in claim 14 wherein, in an enhanced autorotation configuration, the bypass assembly is in the engaged position, the main engine is not operating and the secondary engine provides power to the main drive system through the multimode clutch assembly.

\* \* \* \* \*